A. A. ANDERSON.
JOINT FASTENING FOR FURNITURE.
APPLICATION FILED SEPT. 28, 1911.
1,069,994.
Patented Aug. 12, 1913.
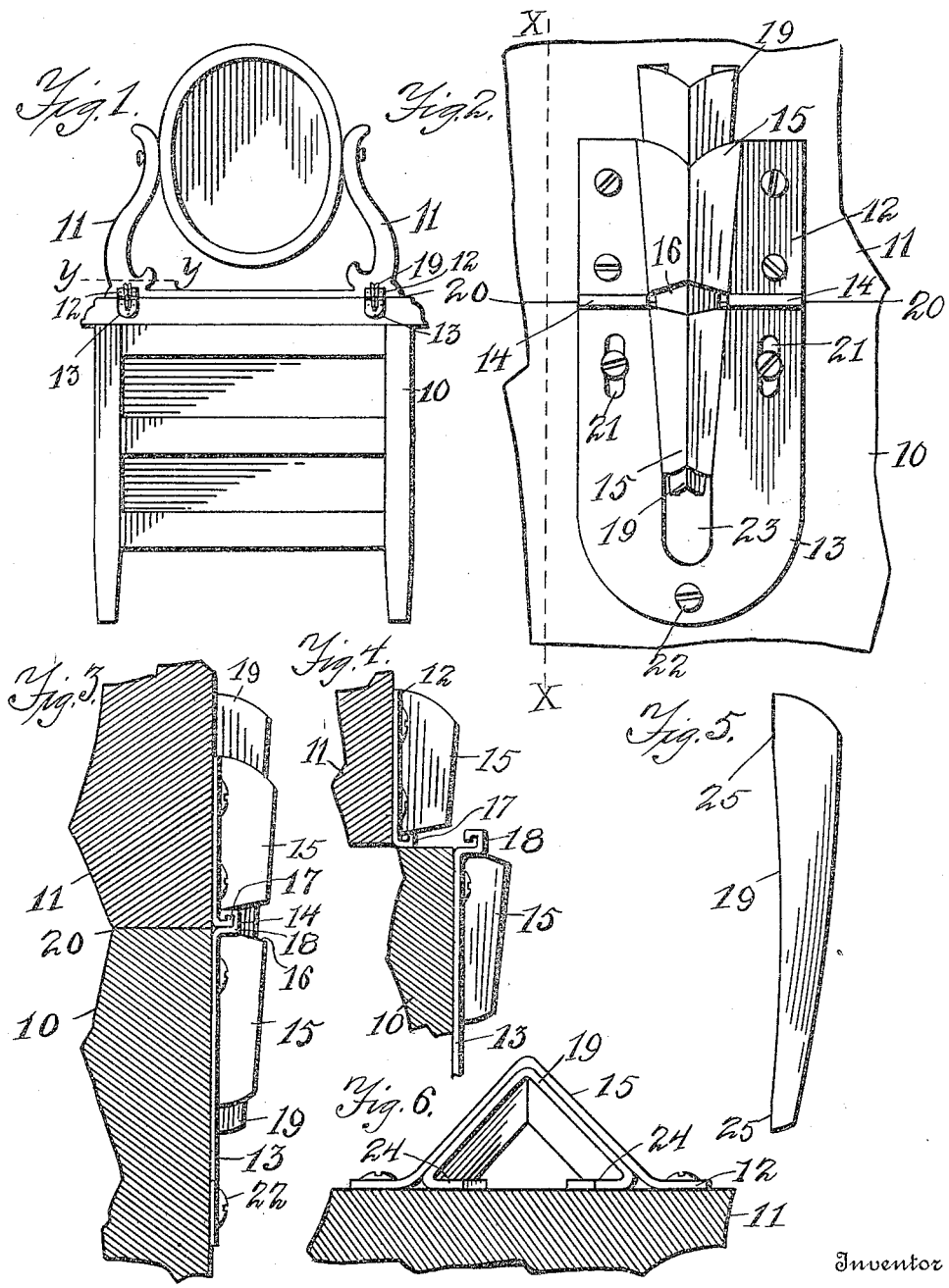

UNITED STATES PATENT OFFICE.

ALFRED A. ANDERSON, OF JAMESTOWN, NEW YORK.

JOINT-FASTENING FOR FURNITURE.

1,069,994.  Specification of Letters Patent.  Patented Aug. 12, 1913.

Application filed September 28, 1911. Serial No. 651,707.

*To all whom it may concern:*

Be it known that I, ALFRED A. ANDERSON, a citizen of the United States, and resident of Jamestown, in the county of Chautauqua and State of New York, have invented new and useful Improvements in Joint-Fastenings for Furniture, of which the following, taken in connection with the accompanying drawings, is a specification.

The invention relates to improvements in fastening devices for furniture; and the object of my improvement is to provide a simple, strong and convenient device for removably fastening together two parts of a piece of furniture, and the invention consists in the construction and arrangement of the parts as described in this specification and shown in the drawings, and pointed out in the claims.

In the drawings, Figure 1 is a rear elevation of a dresser showing my joint fastening as used for attaching the mirror supporting frame to the body of the dresser; and Fig. 2 is an enlarged detail elevation of one of the fastenings as attached to the rear of the dresser and mirror supporting frame. Fig. 3 is a side elevation of the attached fastening from line X X in Fig. 2; and Fig. 4 is a similar view with the parts in the unconnected position and without the wedge. Fig. 5 is an elevation of the wedge showing the preferred contour of the same. Fig. 6 is an elevation of the upper end of the fastening as attached to the dresser and mirror frame, the mirror frame being shown in section at line Y Y in Fig. 1.

Like numerals of reference refer to corresponding parts in the several views.

The numeral 10 designates the body of the dresser, and the numeral 11 the mirror frame. It is obvious that these two parts must be firmly united, yet so that the mirror frame may be quickly and easily removed from the body of the dresser.

The joint fastening consists of two plates 12 and 13 which are connected at 14 at each side of the central raised loop portions 15; the raised portions 15 having opening 16 between the two connections 14 in order that said raised portions may not bind upon one another in connecting the parts. The connections 14 at each side of the raised loops 15 consist of the outward and upward turned flanges 17 on part 12 and the hooked flanges 18 on part 13, which flanges 18 are made to hook over the upwardly turned flanges 17, thereby forming a complete connection between the two parts 12 and 13 which does not permit of their separation when the tubular wedge 19 is inserted in the two raised portions 15. The raised loops 15 are preferably made in the V-shape angular form and gradually diminish toward the lower end on part 13, said lower end of the raised portion being left open. The wedge 19 is preferably made of sheet metal and curved outwardly lengthwise on its inner and outer sides and is made to fit within the raised loops 15 so that by means of said curved sides the wedge will hold strongest at the joint 20 between the two parts 12 and 13 and adjacent the opening 16.

To attach this simple joint fastening to the pieces of furniture, part 12 is attached to part 11 by screws adjacent to the joint 20 between the two parts 10 and 11. The part 13 has slots 21 for the upper screws. Said part 13 is then attached to the part 10 and adjusted as desired so that hooked flanges 18 will hold firmly over the flanges 17 at each side, thereby forming a strong connection 14, after which the lower screw 22 is inserted, thereby securing all the parts in the adjusted position. The wedge 19 is then inserted and driven to place with a light tap of the hammer. A space 23 is provided in the lower end of part 13 for the lower end of wedge 19. It is apparent that the wedge 19 may be quickly and easily removed from the raised loops 15 by a blow of the hammer on the lower end of the wedge.

The wedge 19 is preferably made with inturned edges 24 which bear against both parts of the piece of furniture. The curved inner side of the wedge 19 causes the upper and lower ends 25 to bear against the two parts 10 and 11 of the piece of furniture, thereby pressing the frame 11 forward upon the top of the dresser 10 and insuring a tight joint 20 between the two parts, and the curved outer side of the wedge insures the tight holding of this joint.

I claim as new:

1. In a device of the type set forth, a pair of plates arranged in confronting end to end relation, means to detachably connect said plates to one another at their said confronting ends to prevent lifting of the upper part of the two parts to be connected from the lower part, a loop carried by each plate and arranged in alinement with each other, and a wedge for engagement in said loops.

2. In a device of the type set forth, a pair of plates arranged in confronting end to end relation, means to detachably connect said plates to one another at their said confronting ends, a loop carried by each plate and arranged in alinement with each other, and a tubular wedge for engagement in said loops, the longitudinal side portions of the wedge being turned inwardly to provide substantially wide and flat bearing faces which extend in the same plane as, and are for engagement with the rear faces of the parts to be connected.

3. In a device of the class described, a metal plate, a raised tapered loop on said metal plate to provide a tapered opening therethrough, a second metal plate, a raised tapered loop on said second metal plate to provide a continuation of the tapered opening of said first loop, a sheet metal tapered wedge formed to fit within said loops to hold against the furniture parts and said loops each side of the joint, said tapered wedge curved outwardly in its central portion and the inner edges turned toward one another to bear against said furniture parts and said loops each side of the joint to rigidly hold the same.

4. In a device of the type set forth, a pair of plates arranged in confronting end to end relation, a loop on each plate, the loops of the two plates being alined, and a tubular wedge for engagement in said loops, the longitudinal side portions of the wedge being turned inwardly to provide substantially wide and flat bearing faces that extend in the same plane as, and are for engagement with the rear faces of the parts to be connected.

5. In a device of the class described, a plate having a tapered V-shaped raised portion to form a socket and means for attaching said plate, outwardly turned flanges on the lower edge of said plate each side of said raised portion, a second plate having a tapered central V-shaped raised portion in line with the raised portion of the first of said plates, a tapered wedge to insert within said raised portions, and hooked flanges each side of said raised portions on the upper edge of said second plate to detachably engage over the outwardly turned flanges on said first plate.

In testimony whereof I have signed my name to this specification in the presence of two subscribing witnesses.

ALFRED A. ANDERSON.

Witnesses:
H. U. HARRIS,
A. W. HETTLE.

---

Copies of this patent may be obtained for five cents each, by addressing the "Commissioner of Patents, Washington, D. C."